Patented Jan. 11, 1927.

1,614,398

UNITED STATES PATENT OFFICE.

KARL SCHIRMACHER, KARL ZAHN, AND KARL WILKE, OF HOCHST-ON-THE-MAIN, AND PAUL OCHWAT, OF BAD-SODEN, GERMANY, ASSIGNORS, BY MESNE ASSIGNMENTS, TO GRASSELLI DYESTUFF CORPORATION, OF NEW YORK, N. Y., A CORPORATION OF DELAWARE.

HYDROXY-BENZANTHRONES AND PROCESS OF MAKING SAME.

No Drawing. Application filed April 28, 1924, Serial No. 709,679, and in Germany June 25, 1923.

We have found that new hydroxybenzanthrones can be obtained by nitrating and saponifying an acyl compound of the aminobenzanthrones — derived from benzanthrones by nitration and reduction—diazotizing the nitroamino compounds and treating with agents eliminating amino groups the diazo oxides formed from the diazo compounds by the action of water:

The same compounds are also obtained by heating 6-methoxy-1-benzoylnaphthalines together with aluminium chloride. The new hydroxybenzanthrones have the following constitution:—

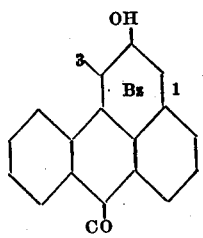

and are therefore to be designated as Bz-2-hydroxybenzanthrones.

In these hydroxybenzanthrones the hydrogen atom of the hydroxyl group may be easily replaced by a radical if the compound is treated with halogen alkyls or any other alkylating agents. This fact could not be foreseen, because for instance according to the statements by Perkin (see Journal of the Chemical Society 121, page 476) the isomeric hydroxybenzanthrone prepared from α-hydroxyanthraquinone could not be converted into the corresponding methyl ether. The new products are intended to be used as intermediate products for making dyestuffs.

The following examples illustrate our invention:

1. 50 parts of aminobenzanthrone having a melting point of about 240° C. and being soluble in concentrated sulfuric acid with a yellowish brown color and a brownish green fluorescence (obtained by reducing the nitrobenzanthrone having the formula obtainable according to Example 1 of patent of addition 6435 to French Patent 349531) are introduced into 500 parts of nitrobenzene and gradually heated to 180–190°, while stirring, with 22 parts of acetyl chloride and then stirred at this temperature for 2 hours. After having cooled the mixture to 5°, 40 parts of nitric acid (specific gravity 1, 5) are added and the whole is heated for 2 hours to 50° C. The mass, when cool, is filtered off and washed with spirit and dried. 66 parts of the yellow nitroaceto compound thus obtained are introduced in the form of a fine powder into 1,200 parts of sulphuric acid (70%) and heated for 2 hours to 90°. The whole is then cooled down to 10° C. and diazotised at this temperature with the calculated quantity of nitrosyl sulphuric acid. During this operation the crystalline magma, which is at first dark greenish-blue, changes into a brownish-yellow solution. After 2 hours have passed, the solution is poured on ice, diluted with about 10,000 parts of water and stirred for 24 hours. During this operation the orange-yellow diazo compound turns into an olive-coloured, voluminous diazo-oxide, which is separated from the liquid by filtration and then washed out with water. The filtered mass is then triturated with a small quantity of water so as to become a fine paste and there is slowly added while cooling with ice an alkaline solution of 70 parts of stannous chloride and 200 parts of caustic potash in 1000 parts of water, whereupon the whole is stirred for 5 hours. After having diluted the mixture with 10,000 parts of water, it is heated to boiling, filtered and the filtrate is precipitated, while hot, by means of hydrochloric acid. After having filtered and washed with water and dried, the hydroxybenzanthrone is obtained as a light yellow powder which dissolves in concentrated sulphuric acid with a yellowish-red colour and a brown fluorescence. In dilute alkalies it is soluble to a brownish-red solution and on addition of concentrated caustic soda solution the alkali salts separate as red precipitates. The product is difficultly soluble in the usual organic solvents, and more readily soluble in hot nitrobenzene. Its melting point lies above 280° C. When heated with acetic anhydride and sodium acetate, it yields an acetyl compound melting at 201°. When fused with alcoholic potash, it furnishes a dyestuff which dyes cotton from a blue hydrosulphite vat olive-green unfast tints.

2. 10 parts of the benzanthrone obtained according to Example 1 are shaken in an aqueous, akaline solution with dimethylsulphate until the light-yellow precipitate increases no longer. This precipitate is then filtered off and washed. When dry, it forms a light yellow powder, which is insoluble in water, diluted acids and alkalies but soluble in concentrated sulphuric acid with a yellowish-red colour and a slight fluorescence. In organic solvents, the methoxybenzanthrone is rather easily soluble with a yellow to brown colour. The diluted alcoholic solution shows a strong green fluorescence. After re-precipitation from benzene, brownish-yellow crystals are obtained melting at 171–173° C. When fused with alcoholic potash it furnishes a dyestuff which dyes cotton from a bluish-violet hydrosulphite vat bluish green fast tints.

3. When treating the hydroxybenzanthrone prepared according to Example 1 with ethyl-iodide and alkali in an alcoholic-aqueous solution, the corresponding ethyl ether is obtained as a yellow product which very much resembles the methyl-ether in regard to its properties. After recrystallization it melts at 169–170°.

The mechanism of the reactions in the formation of Bz-2-hydroxy-benzanthrone is indicated by the following equations:

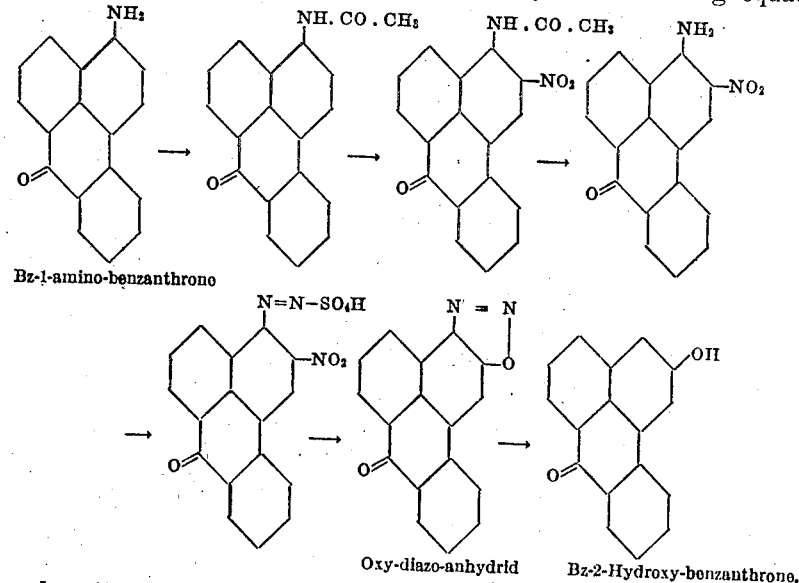

Having now described our invention, what we claim is:

1. As new products, the compounds of the following formula:

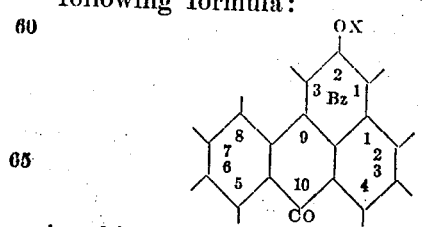

in which X designates hydrogen or an alkyl group.

2. Process of producing Bz-2-hydroxybenzanthrone compounds, consisting in reducing Bz-1-nitrobenzanthrone to Bz-1-aminobenzanthrone, acylating the obtained product, nitrating the Bz-1-acylaminobenzanthrone, saponifying the nitro-Bz-1-acylaminobenzanthrone, diazotising the nitro-Bz-1-amino compound, treating with water and substituting hydrogen for the nitrogen in the oxydiazoanhydride.

In testimony whereof, we affix our signatures.

KARL SCHIRMACHER.
KARL ZAHN.
KARL WILKE.
PAUL OCHWAT.